United States Patent [19]
Lane, Jr.

[11] Patent Number: 5,366,245
[45] Date of Patent: Nov. 22, 1994

[54] LINEAR BUCKLE PRETENSIONER DEVICE

[75] Inventor: Wendell C. Lane, Jr., Romeo, Mich.

[73] Assignee: TRW Vehicle Safety Systems Inc., Lyndhurst, Ohio

[21] Appl. No.: 165,370

[22] Filed: Dec. 10, 1993

[51] Int. Cl.⁵ ............................................. B60R 21/00
[52] U.S. Cl. .................................. 280/806; 297/480; 60/636
[58] Field of Search .................... 280/801 R, 806, 808; 297/478, 480; 60/636

[56] References Cited

U.S. PATENT DOCUMENTS

| | | | |
|---|---|---|---|
| 4,232,886 | 11/1980 | Tsuge et al. | 280/806 |
| 4,385,775 | 5/1983 | Shimogawa et al. | 280/806 |
| 4,917,210 | 4/1990 | Danicek et al. | 180/268 |
| 5,104,193 | 4/1992 | Fohl | 297/480 |

FOREIGN PATENT DOCUMENTS 4101977  7/1992  Germany ............................ 280/806

Primary Examiner—Karin L. Tyson
Assistant Examiner—Paul N. Dickson
Attorney, Agent, or Firm—Tarolli, Sundheim & Covell

[57] ABSTRACT

An apparatus (10) for tensioning safety belt webbing (16) during sudden vehicle deceleration includes a buckle (22), a telescoping frame (26) and an actuator drive (28). The telescoping frame (26) includes first and second frame segments (40) and (42). The buckle (22) is attached to the first frame segment (40). The second frame segment (42) is anchored to the vehicle. The frame segments (40, 42) have a common axis (20) and are slidable relative to each other along the axis (20) to reduce the overall length of the telescoping frame (26). The actuator drive (28) is axially aligned with the telescoping frame (26) and includes a cylinder (138) and a piston (140). The cylinder (138) and piston (140) are movable relative to each other to lengthen the actuator drive (28). The actuator drive (28) is interconnected with the telescoping frame (26) such that lengthening of the actuator drive (28) causes shortening of the telescoping frame (26) to move the buckle 22 and tension the safety belt webbing 16.

15 Claims, 3 Drawing Sheets

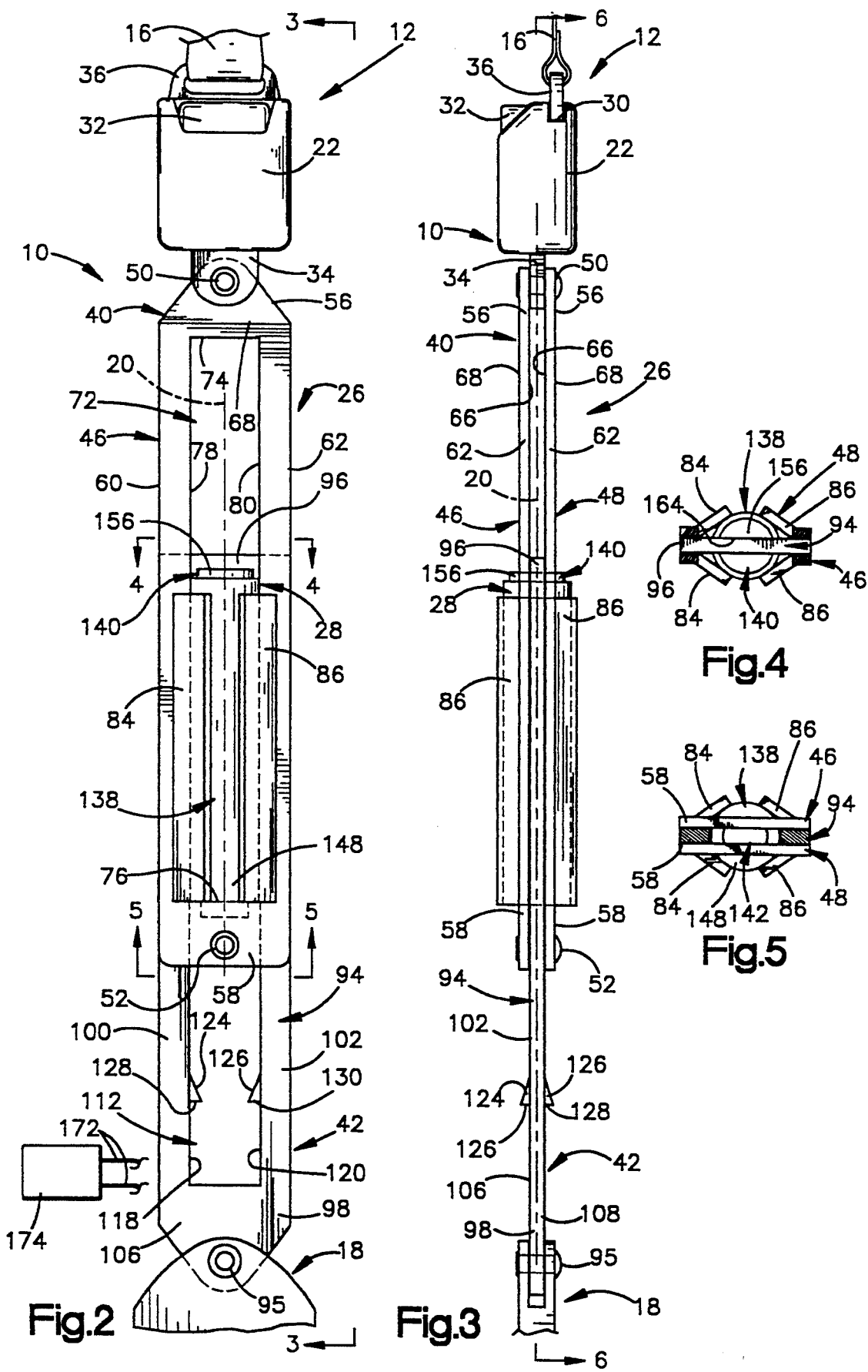

ively sliding the first frame segment 40
LINEAR BUCKLE PRETENSIONER DEVICE

BACKGROUND OF THE INVENTION

The present invention relates to a pretensioner for a vehicle occupant safety belt system.

In a vehicle occupant safety belt system, safety belt webbing extends across the torso of a vehicle occupant to protect the vehicle occupant in the event of sudden vehicle deceleration. A belt pretensioner acts to tension the safety belt webbing upon the occurrence of the sudden vehicle deceleration. In one known safety belt system that includes a pretensioner, belt webbing is connected to a tongue which is latched in a buckle. The buckle is connected by a cable to a piston. The piston is movable to cause the cable to pull the buckle and, thus, pull the safety belt webbing against the occupant.

SUMMARY OF THE INVENTION

The present invention provides a pretensioner apparatus for use with a safety belt webbing which extends across a vehicle occupant. The pretensioner apparatus tensions the safety belt webbing during a sudden vehicle deceleration indicative of a collision. The apparatus includes a member connectable with the safety belt webbing. The apparatus also includes a telescoping frame.

The telescoping frame includes a first frame segment and a second frame segment. The first frame segment has first and second end portions. The first end portion of the first frame segment is connected to the member that is connectable with safety belt webbing. The second frame segment has first and second end portions. The second end portion of the second frame segment is connectable to the vehicle by a suitable anchor.

The first and second frame segments are coaxial and are axially slidable relative to each other to shorten the telescoping frame. When the telescoping frame is shortened, the member connectable with the safety belt webbing moves toward the anchor and the safety belt webbing is tensioned around the occupant.

The pretensioner apparatus also includes a drive device for moving the first and second frame segments relative to each other to shorten the telescoping frame and tension the belt webbing. The drive device is coaxial with the telescoping frame and includes two parts and means for forcing the two parts to move axially relative to each other in response to vehicle deceleration. One of the two parts of the drive device is a cylinder. The other of the two parts is a piston located in the cylinder.

The piston and cylinder are connected between the first end of the second frame segment and the second end of the first frame segment. The piston is axially slidable relative to the cylinder to lengthen the drive device and shorten the telescoping frame. Thus, the member connectable with the safety belt webbing is moved toward the anchor, and the safety belt webbing is tensioned around the occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a view of the apparatus of FIG. 1 assembled;

FIG. 3 is a view taken along line 3—3 of FIG. 2;

FIG. 4 is a view taken along line 4—4 of FIG. 2;

FIG. 5 is a view taken along line 5—5 of FIG. 2;

DESCRIPTION OF PREFERRED EMBODIMENT

Figure 1:
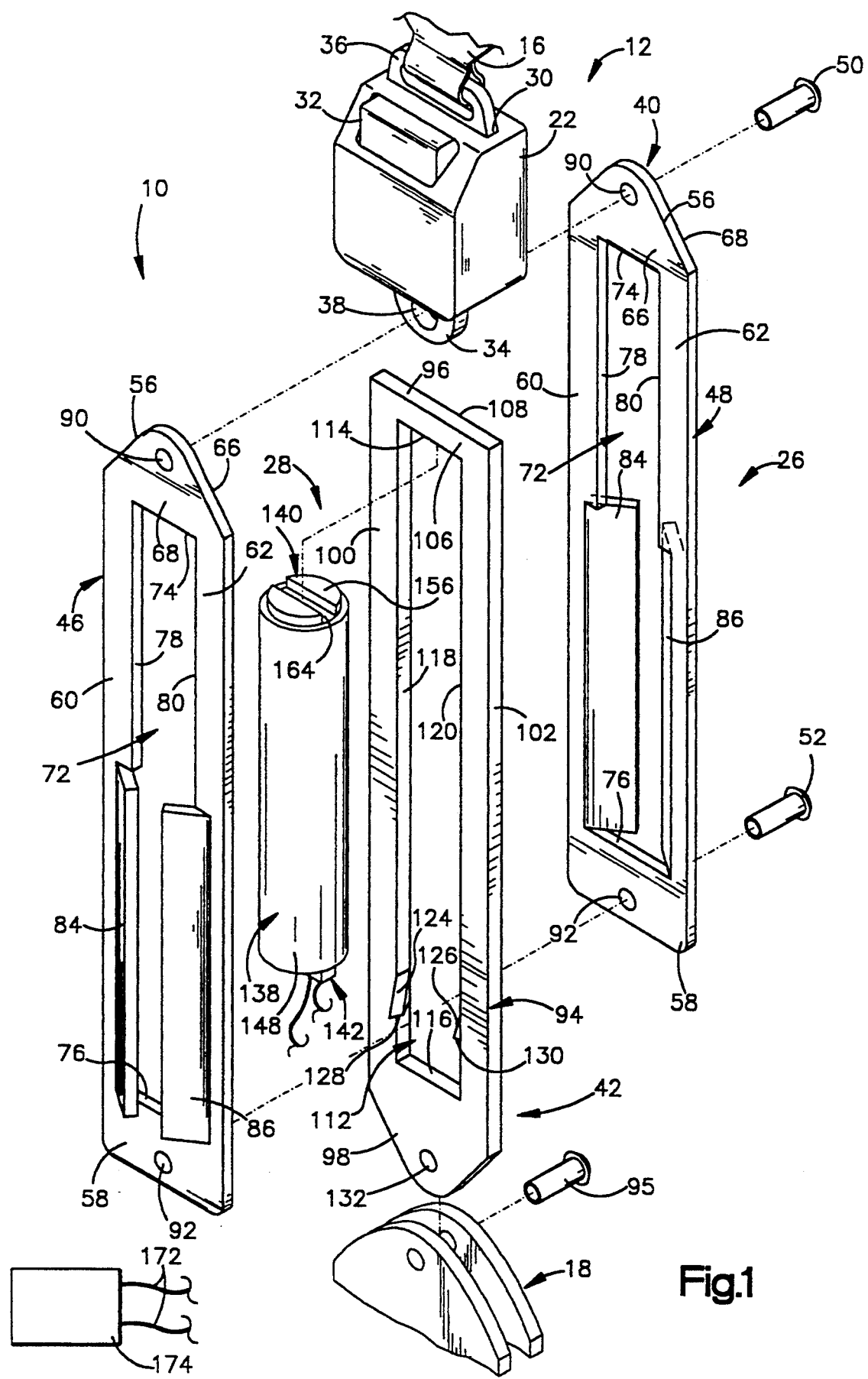
FIG. 1 is an exploded view of an apparatus according to the present invention.

An apparatus 10 constructed in accordance with the present invention is shown in FIG. 1. The apparatus 10 is used in a safety belt system 12 for protecting a vehicle occupant in the event of sudden deceleration, such as occurs in a collision. The safety belt system 12 includes safety belt webbing 16 which is connectable with the apparatus 10 and an anchor 18 which connects the apparatus 10 with the vehicle.

The apparatus 10 includes a buckle 22, a telescoping frame 26 and a linear actuator drive 28. The buckle 22 (FIG. 1) has a cavity 30, a locking mechanism (not shown), a release button 32, and an attachment portion 34. The cavity 30 receives a tongue 36 which is attached to the safety belt webbing 16. The locking mechanism retains the tongue 36 within the cavity 30 such that the safety belt webbing 16 is connected to the buckle 22. The release button 32 is movable to release the locking mechanism and permit the tongue 36 to be removed from the cavity 30 in the buckle 22. The attachment portion 34 has a hole 38 and is connected with the telescoping frame 26 by a suitable fastener 50.

The telescoping frame 26 includes a first frame segment 40 and a second frame segment 42. The first frame segment 40 includes two outer members 46 and 48, the fastener 50, and another fastener 52. The outer member 46 is substantially identical to the outer member 48, and, thus, only the outer member 46 is described herein. Similar reference numbers are used on the drawings to identify similar structure of the outer members 46 and 48.

The outer member 46 has a first end portion 56, a second end portion 58 and two elongate side portions 60 and 62. The side portions 60 and 62 extend parallel to an axis 20 (FIG. 2) of the apparatus 10 between the first and second end portions 56 and 58. The outer member 46 (FIG. 1) is a metal stamping and has an inner major planar surface 66 and an opposed, outer major planar surface 68. An elongate aperture 72 extends through the outer member 46, and is defined by the first and second end portions 56 and 58 and the two side portions 60 and 62. The aperture 72 is elongate along the axis 20. The aperture 72 is bounded by a surface 74 on the first end portion 56 and a surface 76 on the second end portion 58. The aperture 72 is also bounded by a surface 78 on the side portion 60 and a surface 80 on the side portion 62.

A tab 84 extends from the side portion 60 along part of the length of the side portion 60. The tab 84 extends toward the side portion 62 and slants outward away from the outer planar surface 68. The tab 84 lies in a plane which is parallel to, and spaced from, the axis 20. A tab 86 extends from the side portion 62 along part of the length of the side portion 62. The tab 86 extends toward the side portion 60 and slants outward away from the outer planar surface 68. The tab 86 lies in a plane which is parallel to, and spaced from, the axis 20. A hole 90 extends through the first end portion 56, and a hole 92 extends through the second end portion 58.

The attachment portion 34 of the buckle 22 is located between the first end portions 56 of the outer members 46 and 48. The holes 90 on the outer members 46 and 48 are aligned with the hole 38 on the attachment portion 34 of the buckle 22. The fastener 50 extends through the holes 90 and the hole 38 to interconnect the outer members 46 and 48, and to retain the buckle 22 attached to the first frame segment 40. Also, the attachment portion 34 of the buckle 22 spaces the first end portion 56 of the outer member 46 from the first end portion 56 of the outer member 48. The holes 92 on the outer members 46 and 48 are aligned and the fastener 52 extends through the holes 92. The fastener 52 interconnects the outer members 46 and 48. The fasteners 50 and 52 hold the outer members 46 and 48 fixed relative to each other.

The second frame segment 42 (FIGS. 2 and 3) is coaxially aligned with the first frame segment 40. The second frame segment 42 (FIG. 1) includes an inner member 94 and a fastener 95. The inner member 94 has a first end portion 96, a second end portion 98 and two elongate side portions 100 and 102. The side portions 100 and 102 extend parallel to the axis 20 between the first and second end portions 96 and 98. The inner member 94 is a metal stamping which has two opposed, major planar surfaces 106 and 108.

An elongate aperture 112 extends through the inner member 94 and is defined by the first and second end portions 96 and 98 and the two side portions 100 and 102. The aperture 112 extends along the axis 20. The aperture 112 is bounded by a surface 114 on the first end portion 96 and a surface 116 on the second end portion 98. The aperture 112 is also bounded by a surface 118 on the side portion 100 and a surface 120 on the side portion 102.

A projection 124 extends from the side portion 100 at the surface 118. The projection 124 is located near the second end portion 98. The projection 124 twists outward and projects beyond the planar surface 106 and projects downward toward the second end portion 98. The protection 124 has an engagement surface 128 facing the second end portion 98.

A projection 126 extends from the side portion 102. The projection 126 is located near the second end portion 98. The projection 126 twists outward and projects beyond the surface 108 and projects downward toward the second end portion 98. The projection 126 has an engagement surface 130 which faces the second end portion 98.

A hole 132 extends through the second end portion 98 of the inner member 94. The fastener 95 extends through the hole 132 and is connected to the anchor 18. Thus, the fastener 95 retains the inner member 94 of the second frame segment 42 connected to the vehicle.

The inner member 94 (FIG. 3) has approximately the same thickness as the thickness of the attachment portion 34 of the buckle 22. The inner member 94 is sandwiched between the outer members 46 and 48 of the first frame segment 40. The outer member 46 is located adjacent the planar surface 106 of the inner member 94, while the outer member 48 is located adjacent the opposite planar surface 108 of the inner member 94. Thus, the inner member 94 spaces the second end portion 58 of the outer member 46 from the second end portion 58 of the outer member 48. The fastener 52 (FIG. 1) extends through the aperture 112 of the inner member 94.

The aperture 112 of the inner member 94 partially overlaps the aperture 72 on the outer member 46 and the aperture 72 on the outer member 48. The surface 106 of the inner member 94 is in engagement with the inner planar surface 66 of the outer member 46. The surface 108 of the inner member 94 is in engagement with the inner planar surface 66 of the outer member 48. The fasteners 50 and 52 hold the outer members 46 and 48 against the inner member 94 sufficiently tightly to provide friction which resists relative movement between the outer members 46 and. 48 of the first frame segment 40 and the inner member 94 of the second frame segment 42. However, the outer members 46 and 48 can slide relative to the inner member 94 when the frictional resistance is overcome.

Figure 6:
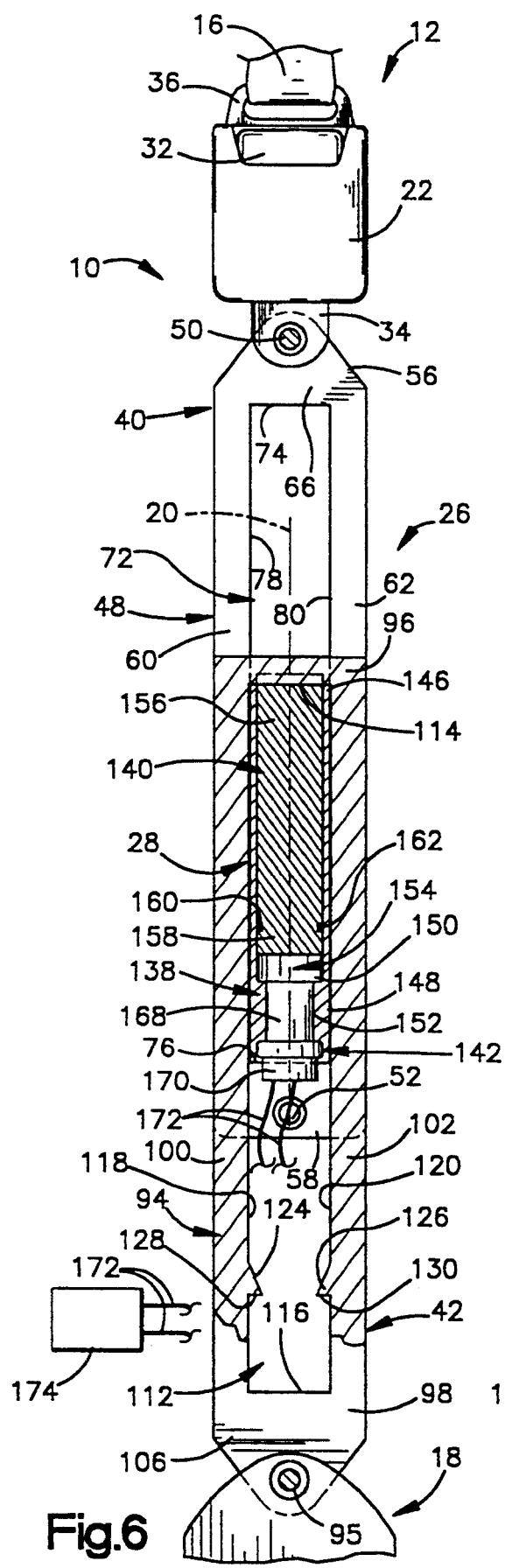
FIG. 6 is a partial sectional view taken along line 6—6 of FIG. 3 showing the apparatus in a first operational position.
Figure 7:
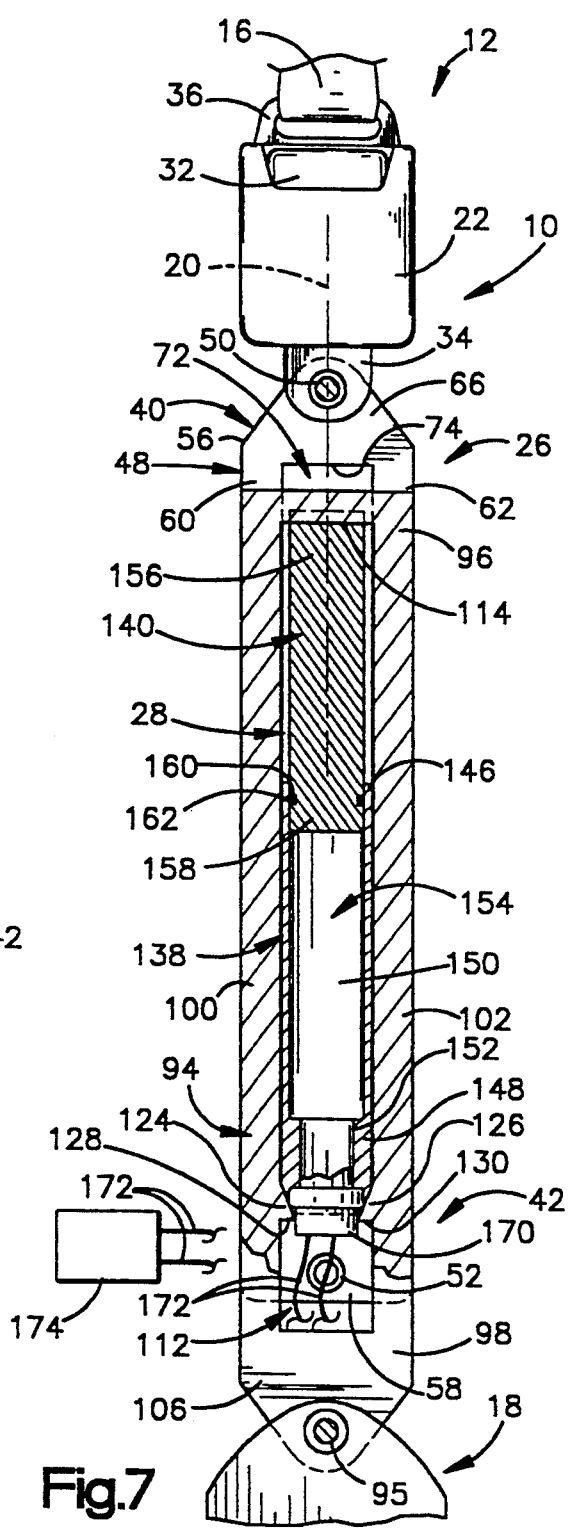
FIG. 7 is a partial sectional view of the apparatus in a second operational position.

The telescoping frame 26 (FIG. 6) has an overall length which extends along the axis 20 between the buckle 22 and the anchor 18. The first frame segment 40 is movable relative to the second frame segment 42 to telescope inward (toward anchor 18) to reduce the overall length of the telescoping frame 26 (FIG. 7). Specifically, the outer members 46 and 48 of the first frame segment 40 slide downward relative to the inner member 94 of the second frame segment 42.

After the outer members 46 and 48 of the first frame segment 40 slide downward relative to the inner member 94, upward movement of the outer members 46 and 48 is arrested by the projections 124 and 126 on the inner member 94. Specifically, as the outer members 46 and 48 are moved downward, the projections 124 and 126 are flexed toward surfaces 106 and 108, respectively, by the second end portions 58 of the outer members 46 and 48. Once the second end portions 58 pass the projections 124 and 126, the projections 124 and 126 spring away from surfaces 106 and 108, respectively. Thus, the projection 124 partially overlaps the surface 76 on the outer member 46 and the projection 126 partially overlaps the surface 76 on the outer member 48. When the projections 124 and 126 partially overlap the surfaces 76, any upward movement of the outer members 48 and 46 will cause the surfaces 76 to abut against the engagement surfaces 128 and 130 on the projections 124 and 126, respectively, and further upward movement is arrested.

The actuator drive 28 (FIG. 1) includes a cylinder 138, a piston 140 and a pyrotechnic device 142. The cylinder 138 (FIG. 6) has a first end portion 146, a second end portion 148, a cylindrical bore 150 and a charge chamber 152. The bore 150 is open at the first end portion 146 and extends into the interior of the cylinder 138. The charge chamber 152 is open at the second end portion 148 and extends to communicate with the bore 150.

The piston 140 is cylindrical and is located within the bore 150. The piston 140 is movable relative to the cylinder 138. The piston 140 has a first end portion 156 adjacent the first end portion 146 of the cylinder 138 and a second end portion 158 adjacent the second end portion 148 of the cylinder 138. The cylinder 138 and the piston 140 define an enclosed chamber 154 in the bore 150 between the second portion 158 of the piston and the second portion 148 of the cylinder. The piston 140 has an annular groove 160 located adjacent to the second end portion 158. An O-ring seal 162 is located in the annular groove 160 on the piston 140 and engages the cylinder 138. The O-ring seal 162 prevents escape of any fluid contents in the chamber 154. A diametrical end groove 164 (FIG. 1) is located in the first end portion 156 of the piston 140.

The pyrotechnic device 142 (FIG. 6) includes a suitable pyrotechnic charge 168 and a squib 170. The charge 168 includes a combustible gas generating material. Upon combustion of the gas generating material, a volume of gas is created. The squib 170 ignites the gas generating material of the charge 168.

The charge 168 and the squib 170 are located in the charge chamber 152 of the cylinder 138. The charge 168 and the squib 170 are fixed relative to the cylinder 138 by means of potting or a similar fastening mechanism. The squib 170 has lead lines 172 which are connected to a vehicle deceleration sensor 174. The sensor 174 senses deceleration of the vehicle normally associated with a vehicle collision. The sensor 174 causes a signal to be sent to the squib 170 via the lead lines 172 to ignite the squib 170.

Upon ignition of the squib 170 (FIG. 7), the charge 168 is ignited to provide a volume of gas. The volume of gas is entrapped in the chamber 154. The entrapped gas pushes upon the cylinder 138 and the piston 140 to force the cylinder 138 and the piston 140 to move relative to each other and expand the size of the chamber 154. The first end portion 156 of the piston 140 is moved out of the bore 150 such that the piston 140 telescopes out of the cylinder 138. Thus, the overall length of the actuator drive 28 is increased.

The actuator drive 28 (FIG. 6) is coaxially mounted within the telescoping frame 26. The actuator drive 28 (FIG. 1) is located within the aperture 112 of the inner member 94, within the aperture 72 of the outer member 46, and within the aperture 72 of the outer member 48. The first end portion 156 of the piston 140 engages the first end portion 96 (FIGS. 1 and 4) of the inner member 94. The surface 114 of the first end portion 96 of the inner member 94 is located in the end groove 164 at the first end portion 156 of the piston 140. The surfaces defining the end groove 164 and the adjacent surface of the inner member 94 cooperate to prevent relative lateral movement between the piston 140 and the inner member 94.

The second end portion 148 (FIGS. 1 and 5) of the cylinder 138 rests on the surfaces 76 of the second end portions 58 of the outer members 46 and 48. A part of the squib 170 of the pyrotechnical device 142 is located between the second end portion 58 of the outer member 46 and the second end portion 58 of the outer member 48. The tabs 84 and 86 of the outer members 46 and 48 engage and retain the cylinder 138. Thus, the cylinder 138 is prevented from moving relative to the outer members 46 and 48 of the first frame segment 40.

The tabs 84 and 86 engage and retain the cylinder 138 to prevent movement of the cylinder 138 relative to the first frame segment 40. The actuator drive 28 is retained within the telescoping frame 26 because the outer members 46 and 48 are held against the inner member 94 by the fasteners 50 and 52. Thus, the actuator drive 28 is entrapped between the first end portion 96 of the inner member 94 and the second end portions 58 of the outer members 46 and 48. The actuator drive 28 prevents elongation of the telescoping frame 26 because the actuator drive 28 blocks movement of the second end portions 58 of the outer members 46 and 48 toward the first end portion 96 of the inner member 94.

A flexible rubber boot (not shown) encloses the telescoping frame 26 and the actuator drive 28. The boot has accordion pleating to permit linear compression. The boot provides protection for the apparatus 10.

During use of the safety belt system 12, the safety belt webbing 16 extends across the vehicle occupant and the tongue 36 is retained in the buckle 22 by the lock mechanism (not shown). During non-deceleration conditions, the location of the actuator drive 28 between the first end portion 96 of the inner member 94 and the second end portions 58 of the outer members 46 and 48 prevents elongation of the telescoping frame 26. Also, the frictional engagement between the inner member 94 and the outer members 46 and 48 prevents a premature inward telescoping movement of the telescoping frame 26.

During sudden deceleration of the vehicle, such as in a collision, the sensor 174 senses the deceleration and a signal is provided to the squib 170. The squib 170 is ignited and, in turn, ignites the gas generating material in the charge 168. The gas generating material combusts to produce a volume of gas. The volume of gas is trapped within the chamber 154. The pressure of the volume of gas within the chamber 154 causes the chamber 154 to expand due to outward movement of the piston 140 from the cylinder 138.

During relative movement of the piston 140 and the cylinder 138 of the actuator drive 28, the first end portion 156 of the piston 140 pushes against the first end portion 96 of the inner member 94. Also, during relative movement of the piston 140 and the cylinder 138, the second end portion 148 of the cylinder 138 pushes against the second end portions 58 of the outer members 46 and 48. The friction between the inner member 94 and the outer members 46 and 48 is overcome, and the second end portions 58 of the outer members 46 and 48 move away from the first end portion 96 of the inner member 94. The outer members 46 and 48 slide downward relative to the inner member 94 and the vehicle because the inner member 94 is fixed relative to the vehicle by the anchor 18. As the outer members 46 and 48 move downward, the buckle 22 also moves downward toward the anchor 18 because the buckle 22 is connected to the outer members 46 and 48 of the first frame segment 40. Downward movement of the buckle 22 tensions the safety belt webbing 16.

Relative movement of the piston 140 out of the cylinder 138 increases the overall length of the actuator drive 28. As the overall length of the actuator drive 28 increases, the outer members 46 and 48 slide downward relative to the inner member 94. Downward sliding of the outer members 46 and 48 relative to the inner member 94 reduces the overall length of the telescoping frame 26. Reducing the overall length of the telescoping frame moves the buckle 22 downward and tensions the safety belt webbing 16 about the occupant.

As the outer members 46 and 48 move downward relative to the inner member 94, the second end portions 58 of the outer members 46 and 48 move past the projections 124 and 126 on the inner member 94. The projections 124 and 126 are flexed inward as the second end portions 58 pass. Once the second end portions 58 are past the projections 124 and 126, the projections 124 and 126 spring outward. The outer members 46 and 48 move downward until the fastener 52 of the first frame segment 40 engages the surface 116 on the inner member 94. Once the downward movement of the outer members 46 and 48 is stopped, the overall length of the telescoping frame 26 is at a minimum. Also, the safety belt webbing 16 is tensioned.

If the vehicle occupant exerts force on the safety belt webbing 16, the safety belt webbing 16 will transmit a force which tends to move the buckle 22 upward. Upon a slight upward movement of the buckle 22, the first frame segment 40 tends to move upward. However, as the outer members 46 and 48 of the first frame segment 40 move upward, the surfaces 76 of the second end portions 58 contact the engagement surface 128 on the projection 124 and the engagement surface 130 on the projection 126. The projections 124 and 126 arrest upward movement of the outer members 46 and 48 of the first frame segment 40. Therefore, the telescoping frame 26 is not permitted to elongate after the actuator drive 28 has moved the outer members 46 and 48 relative to the inner member 94. The safety belt webbing 16 can be released from extending across the vehicle occupant by normal movement of the release button 32 to release the lock mechanism (not shown) to permit the tongue 36 to be removed from the cavity 30 of the buckle 22.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for use with safety belt webbing which extends across a vehicle occupant, said apparatus comprising:
    a member connectable with the safety belt webbing;
    an anchor connectable with the vehicle;
    telescoping frame means for interconnecting said member and said anchor including a first frame segment and a second frame segment;
    said first frame segment having first and second end portions, said first end portion of said first frame segment being connected to said member;
    said second frame segment having first and second end portions, said second end portion of said second frame segment being connectable with said anchor;
    said first and second frame segments being coaxial and being axially slidable relative to each other so as to shorten said telescoping frame means; and
    drive means for moving said first and second frame segments relative to each other to shorten said telescoping frame means, said drive means being coaxial with said telescoping frame means, said drive means including two parts and means for forcing said two parts to move axially relative to each other in response to vehicle deceleration, one of said two parts of said drive means being a cylinder, the other of said two parts of said drive means being a piston received within said cylinder, said piston being axially slidable relative to said cylinder to lengthen said drive means and shorten said telescoping frame means, thereby moving said member toward said anchor and tensioning the safety belt webbing.

2. An apparatus as set forth in claim 1, wherein said means for forcing said two parts of said drive means to move axially includes a gas source, said gas source providing gas for forcing said piston to move relative to said cylinder.

3. An apparatus as set forth in claim 1, wherein said first frame segment includes a first elongate aperture, and said second frame segment includes a second elongate aperture, said drive means being located within both of said first and second apertures.

4. An apparatus as set forth in claim 1, wherein said frame means has an axis, said second frame segment includes two elongate side portions which extend parallel to the axis, and each side portion extends between said first and second end portions of said second frame segment.

5. An apparatus as set forth in claim 1, wherein said piston is engaged with said first end portion of said second frame segment and said cylinder is engaged with said second end portion of said first frame segment.

6. An apparatus as set forth in claim 1, wherein said piston has a groove, said first end portion of said second frame segment extending into said groove.

7. An apparatus as set forth in claim 1, wherein said first frame segment includes interior surface means for defining a space, said second frame segment extending into the space, said interior surface means of said first frame segment guiding relative movement between said first and second frame segments.

8. An apparatus as set forth in claim 1, including arrest means for substantially preventing lengthening of said telescoping frame means after shortening of said telescoping frame means by relative movement of said first and second frame segments.

9. An apparatus as set forth in claim 8, wherein said arrest means includes a projection on said second frame segment for engaging said second end portion of said first frame segment.

10. An apparatus as set forth in claim 8, wherein said means for forcing said two parts of said drive means to move axially includes a gas source, said gas source providing gas for forcing said piston to move relative to said cylinder.

11. An apparatus as set forth in claim 10, wherein said gas source is a combustible gas generating material which is ignited upon sudden vehicle deceleration.

12. An apparatus as set forth in claim 1, wherein said first frame segment includes two first frame members which each have retention means for engaging said cylinder and holding said cylinder relative to said first frame segment.

13. An apparatus as set forth in claim 12, wherein said first frame segment includes connector means for interconnecting said two first frame members of said first frame segment, said two first frame members being located on opposite sides of said second frame segment.

14. An apparatus as set forth in claim 12, wherein said frame means has an axis and each of said two first frame members of said first frame segment includes two elongate side portions which extend parallel to the axis, each side portion extending between said first and second portions of said first frame segment.

15. An apparatus as set forth in claim 1, wherein said drive means forces said second end portion of the first frame segment toward said anchor and moves said member toward said first end portion of said second frame segment during movement of said first and second frame segments relative to each other by the drive means.

* * * * *